US010281185B2

(12) United States Patent
Uemura et al.

(10) Patent No.: US 10,281,185 B2
(45) Date of Patent: May 7, 2019

(54) MOTOR DRIVING DEVICE, AND HEAT PUMP DEVICE AND REFRIGERATING AND AIR CONDITIONING DEVICE USING THE MOTOR DRIVING DEVICE

(71) Applicant: Mitsubishi Electric Corporation, Tokyo (JP)

(72) Inventors: Keisuke Uemura, Tokyo (JP); Kazunori Hatakeyama, Tokyo (JP); Yosuke Shinomoto, Tokyo (JP); Koichi Arisawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/754,660

(22) PCT Filed: Aug. 28, 2015

(86) PCT No.: PCT/JP2015/074482
§ 371 (c)(1),
(2) Date: Feb. 23, 2018

(87) PCT Pub. No.: WO2017/037791
PCT Pub. Date: Mar. 9, 2017

(65) Prior Publication Data
US 2018/0245831 A1 Aug. 30, 2018

(51) Int. Cl.
F25B 49/02 (2006.01)
H02P 6/16 (2016.01)
(Continued)

(52) U.S. Cl.
CPC ............ F25B 49/025 (2013.01); F25B 30/02 (2013.01); H02P 6/16 (2013.01); H02P 11/06 (2013.01)

(58) Field of Classification Search
CPC .......... H02P 27/08; H02P 27/06; H02P 21/22; H02P 25/024; H02P 11/06; F25B 49/025; F25B 30/02; F25B 31/02; F25B 2600/024
See application file for complete search history.

(56) References Cited

U.S. PATENT DOCUMENTS 5,250,890 A * 10/1993 Tanamachi ........ H02M 7/53873
318/807
7,504,784 B2 * 3/2009 Asada ................... D06F 37/304
318/400.02
(Continued)

FOREIGN PATENT DOCUMENTS

JP 2001-032717 A 2/2001
JP 2003-189670 A 7/2003
(Continued)

OTHER PUBLICATIONS

"Design and Control of Interior Permanent Magnet Synchronous Motor", Ohmsha, Ltd. p. 112 Fig. 5.2, Formula 5.6, I.1-I.3, Oct. 25, 2001. (English translation of relevant part; discussed on p. 2 of the specification).
(Continued)

Primary Examiner — Thai T Dinh
(74) Attorney, Agent, or Firm — Posz Law Group, PLC

(57) ABSTRACT

The invention includes an inverter to convert a direct-current voltage from a direct-current power supply into an alternating-current voltage and apply the alternating-current voltage to a motor that, a direct-current-voltage detecting unit to detect a voltage in the direct-current power supply, a current detecting unit to detect an electric current flowing to the inverter, and an inverter control unit to generate PWM signals for driving switching elements of the inverter based on the detected voltage the detected electric current, to set a specific phase difference between a phase of a carrier signal used for generation of the PWM signals and a phase of the
(Continued)

alternating-current voltage, and to control the inverter such that a frequency of the PWM signals are synchronized with a frequency of the alternating-current voltage, the frequency of the PWM signals being an integer multiple of three times the frequency of the alternating-current voltage.

14 Claims, 15 Drawing Sheets

(51) Int. Cl.
F25B 30/02 (2006.01)
H02P 11/06 (2006.01)

(56) References Cited

U.S. PATENT DOCUMENTS

| 8,680,794 | B2* | 3/2014 | Kazama | B60L 11/1803 |
| | | | | 318/437 |
| 9,651,289 | B2* | 5/2017 | Hatakeyama | H02M 7/53875 |
| 9,825,575 | B2* | 11/2017 | Yamakawa | F24F 1/0007 |
| 9,998,054 | B1* | 6/2018 | Yohanan | H02P 27/047 |
| 2006/0082339 | A1* | 4/2006 | Hamaoka | F04B 35/04 |
| | | | | 318/400.21 |
| 2007/0103950 | A1* | 5/2007 | Arisawa | H02M 7/53875 |
| | | | | 363/132 |
| 2013/0152609 | A1 | 6/2013 | Hatakeyama et al. | |

FOREIGN PATENT DOCUMENTS

| JP | 2006-014426 A | 1/2006 |
| JP | 2011-004538 A | 1/2011 |
| JP | 2015-129600 A | 7/2015 |
| WO | 2012/029099 A1 | 3/2012 |

OTHER PUBLICATIONS

International Search Report of the International Searching Authority dated Nov. 17, 2015 for the corresponding International application No. PCT/JP2015/074482 (and English translation).
Office Action dated Aug. 14, 2018 issued in corresponding JP patent application No. 2017-537061 (and English translation).

* cited by examiner

|     | 5a | 5b | 5c |
|-----|----|----|----|
| V0  | 0  | 0  | 0  |
| V1  | 1  | 0  | 0  |
| V2  | 0  | 1  | 0  |
| V3  | 0  | 0  | 1  |
| V4  | 1  | 1  | 0  |
| V5  | 0  | 1  | 1  |
| V6  | 1  | 0  | 1  |
| V7  | 1  | 1  | 1  |

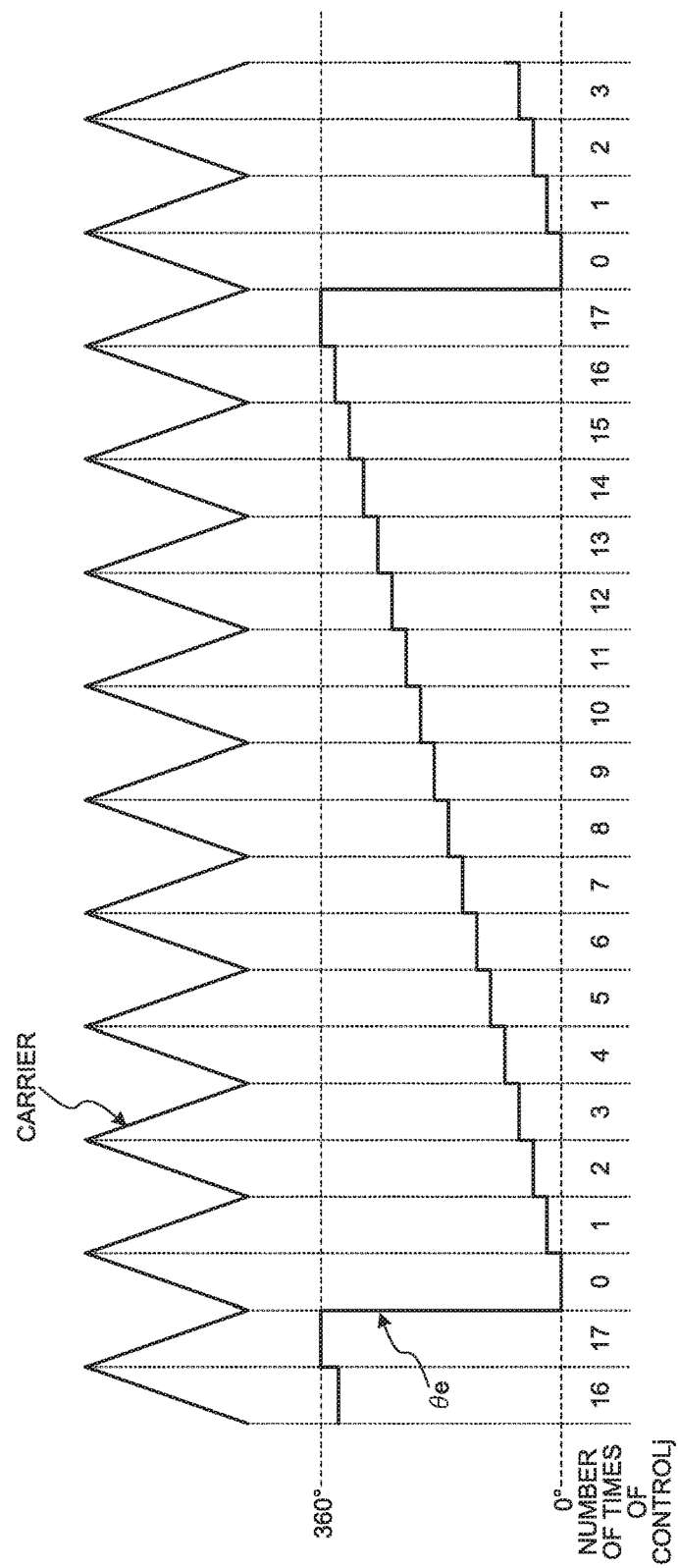

MOTOR DRIVING DEVICE, AND HEAT PUMP DEVICE AND REFRIGERATING AND AIR CONDITIONING DEVICE USING THE MOTOR DRIVING DEVICE

CROSS REFERENCE TO RELATED APPLICATION

This application is a U.S. national stage application of International Patent Application No. PCT/JP2015/074482 filed on Aug. 28, 2015, the disclosure of which is incorporated herein by reference.

TECHNICAL FIELD

The present invention relates to a motor driving device that drives a motor, and a heat pump device and a refrigerating and air conditioning device using the motor driving device.

BACKGROUND

There is a technique to detect phase currents that flow through a three-phase load by using a shunt resistance. In a configuration provided with a shunt resistance, a power-supply shunt resistance that detects an electric current flowing between a direct-current power supply and an inverter device is provided (hereinafter, this configuration is referred to as "single-shunt current detection method"). In this case, the phase of a load current that flows through the power-supply shunt resistance is changed in accordance with the state of an inverter output voltage, that is, the on-state or off-state of inverter switching elements. Thus, a voltage drop at the power-supply shunt resistance is detected in accordance with the on-state or off-state of the inverter switching elements, and thereby the load current can be detected.

Meanwhile, the single-shunt current detection method has a problem in that it may be difficult to detect electric currents for two phases depending on the phase of the inverter output voltage. As a solution to this problem, the following two Patent Literatures are disclosed, for example.

Non Patent Literature 1 listed below is a publicly-known document related to an interior permanent magnet synchronous motor. Non Patent Literature 1 is mentioned later in "Description of Embodiments".

PATENT LITERATURES

Patent Literature 1: Japanese Patent Application Laid-open No. 2003-189670
Patent Literature 2: Japanese Patent Application Laid-open No. 2011-4538

NON PATENT LITERATURE

Non Patent Literature 1: "Design and control of interior permanent magnet synchronous motor", published on Oct. 25, 2001, Ohmsha, Ltd.

According to Patent Literature 1, a PWM signal is corrected in such a manner that the duty value does not vary during the current detecting period. However, because this technique is equivalent to correcting the original inverter output voltage, there is a concern about generation of vibration and noise in a case where, for example, a motor load is used.

According to Patent Literature 2, when only an electric current for one phase is detected, the value of an electric current that has an opposite polarity to the detected electric current and that is half the value of the detected electric current is used as a current value for the other two phases. In this case, because the values of undetectable phase currents are calculated and used for control, there is a difference between an actual phase current and a controlled phase current. For example, at the time of executing a sensorless position control on a three-phase motor, an error occurs in the position estimation results. Thus, there is a possibility in that the error may cause generation of vibration and noise and unstable control.

SUMMARY

An object of the present invention is to provide a motor driving device that detects electric currents for two phases without correcting an inverter output voltage, and also provide a heat pump device and a refrigerating and air conditioning device using the motor driving device.

A motor driving device according to an aspect of the present invention includes an inverter to convert a direct-current voltage from a direct-current power supply into an alternating-current voltage and apply the alternating-current voltage to a motor that rotationally drives a load, a direct-current-voltage detecting unit to detect a voltage in the direct-current power supply, and a current detecting unit to detect an electric current flowing to the inverter. Switching elements of the inverter are driven by PWM signals. The PWM signals are generated on the basis of information of a voltage detected by the direct-current-voltage detecting unit and information of an electric current detected by the current detecting unit. A phase difference between a phase of a carrier signal used for generation of the PWM signals and a phase of the alternate-current voltage is set to a certain phase difference, and a frequency of the PWM signals is synchronized with a frequency of the alternating-current voltage, the frequency of the PWM signals being an integer multiple of three times the frequency of the alternating-current voltage.

According to the present invention, there is an effect where at least electric currents for two phases can be detected regardless of a phase of an inverter output voltage.

BRIEF DESCRIPTION OF DRAWINGS

FIG. 17 is a waveform diagram illustrating a relation between the vector rotation angle θe and a carrier when the inverter is operated by the inverter control unit with nine pulses.

DETAILED DESCRIPTION

Figure 1:
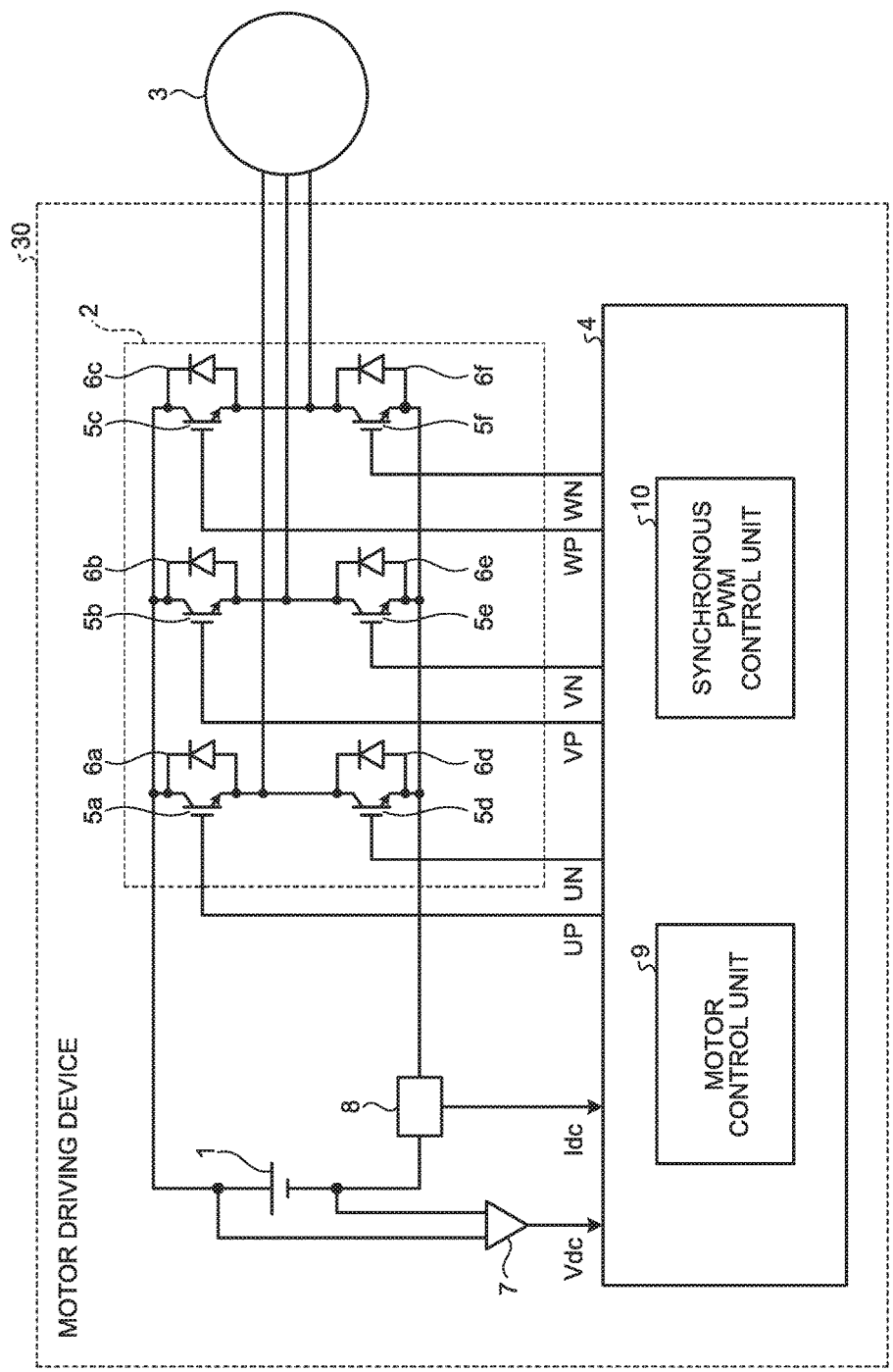
FIG. 1 is a circuit diagram illustrating a configuration of a motor driving device according to an embodiment of the present invention.

First, a basic configuration and operation of a motor driving device according to an embodiment of the present invention is described. FIG. 1 is a circuit diagram illustrating a configuration of a motor driving device 30 according to the present embodiment. As illustrated in FIG. 1, the motor driving device 30 according to the present embodiment is a device that supplies alternating-current power to a motor 3 that is an alternating-current motor to drive the motor 3. The motor driving device 30 is configured by including a direct-current power supply 1 that is a supply source of direct-current power, an inverter 2 that converts a direct voltage into an alternating voltage and applies an alternating-current voltage to the motor 3, and an inverter control unit 4 that controls the inverter 2.

In the motor driving device 30 illustrated in FIG. 1, the inverter 2 is configured by including switching elements 5a to 5f and diodes 6a to 6f that are connected in parallel to the switching elements 5a to 5f, respectively. A direct-current-voltage detecting unit 7 that detects a voltage in the direct-current power supply 1, and a current detecting unit 8 that detects an electric current flowing to the inverter 2 are provided for the inverter 2. On the basis of a voltage Vdc that serves as information of the voltage detected by the direct-current-voltage detecting unit 7 and an electric current Idc that serves as information of the electric current detected by the current detecting unit 8, the inverter control unit 4 generates Pulse Width Modulation (hereinafter, "PWM") signals UP, VP, WP, UN, VN, and WN. The inverter control unit 4 outputs the generated PWM signals UP, VP, WP, UN, VN, and WN to the inverter 2 to drive the switching elements 5a to 5f, respectively. The inverter 2 controlled by the PWM signals UP, VP, WP, UN, VN, and WN applies an instructed alternating-current voltage to the motor 3.

The direct-current power supply 1 may be a direct-current power supply that is generated by rectifying the voltage of an alternating-current power supply by a diode bridge or the like and further smoothing the rectified voltage. It is also possible to use a typical direct-current power supply such as a solar cell or a battery.

The current detecting unit 8 is provided on the input side of the inverter 2. However, it is possible that the current detecting unit 8 is provided between the inverter 2 and the motor 3 to detect electric currents Iu, Iv, and Iw flowing respectively through a U-phase, a V-phase, and a W-phase (hereinafter, "UVW-phases" as needed) that are the phases of the motor 3. It is also possible that the current detecting unit 8 is provided on the negative side of each of the switching elements 5d to 5f to detect the respective electric currents Iu, Iv, and Iw flowing through the phases of the motor 3. That is, any unit or method may be used as long as it is capable of detecting the electric currents Iu, Iv, and Iw flowing through the phases of the motor 3.

Referring back to FIG. 1, the inverter control unit 4 is configured by including a motor control unit 9 that calculates voltage commands Vu*, Vv*, and Vw* and a phase angle θv of the voltage commands Vu*, Vv*, and Vw* (hereinafter, "voltage phase" as needed) on the basis of the voltage Vdc detected by the direct-current-voltage detecting unit 7 and the electric current Idc detected by the current detecting unit 8, and a synchronous PWM control unit 10 that generates the PWM signals UP, VP, WP, UN, VN, and WN by using the voltage commands Vu*, Vv*, and Vw* and the voltage phase θv. The configuration and operation of the motor control unit 9 and the synchronous PWM control unit 10 are described below.

Figure 2:
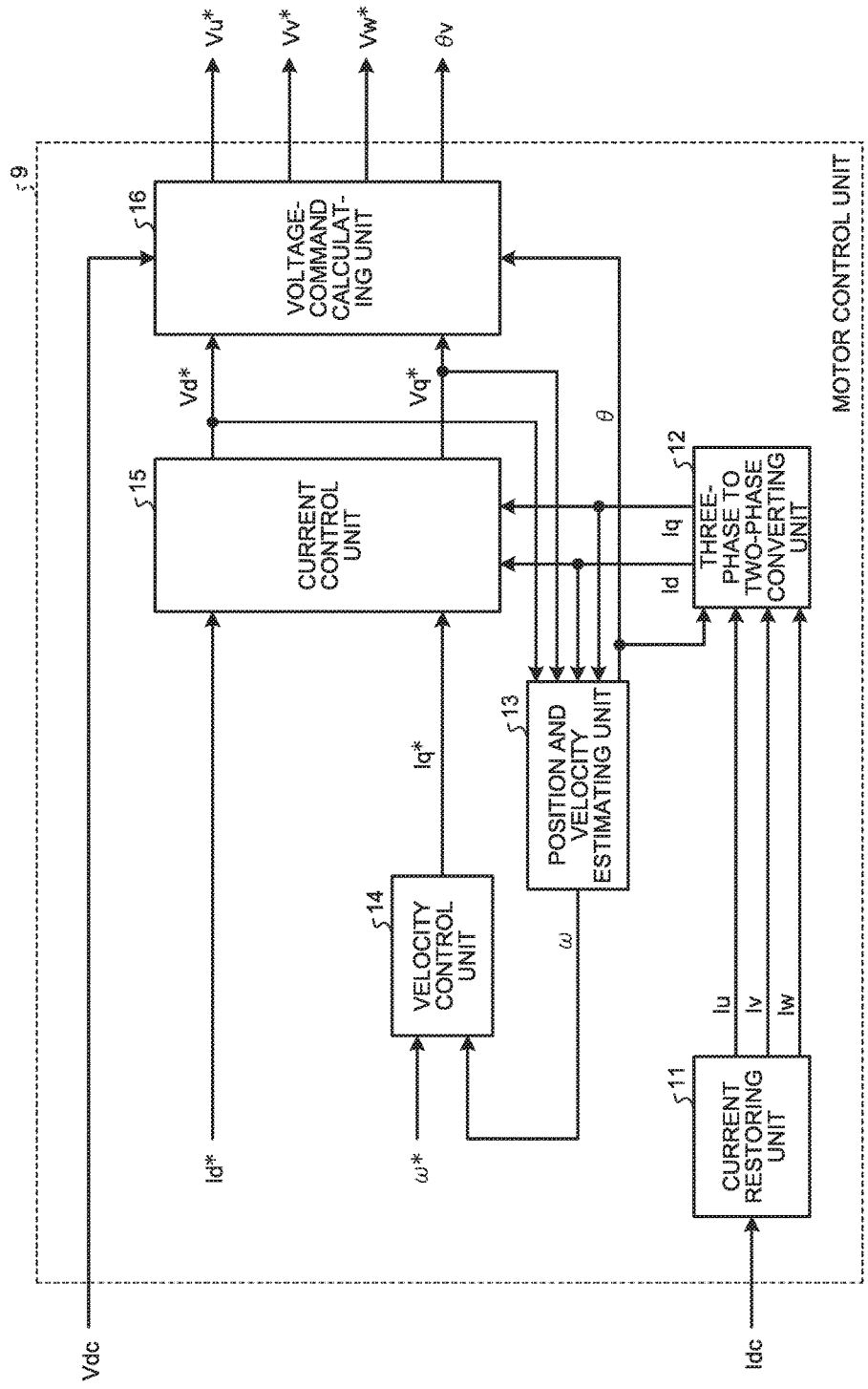
FIG. 2 is a block diagram illustrating a configuration of a motor control unit according to the embodiment.
Figure 3:
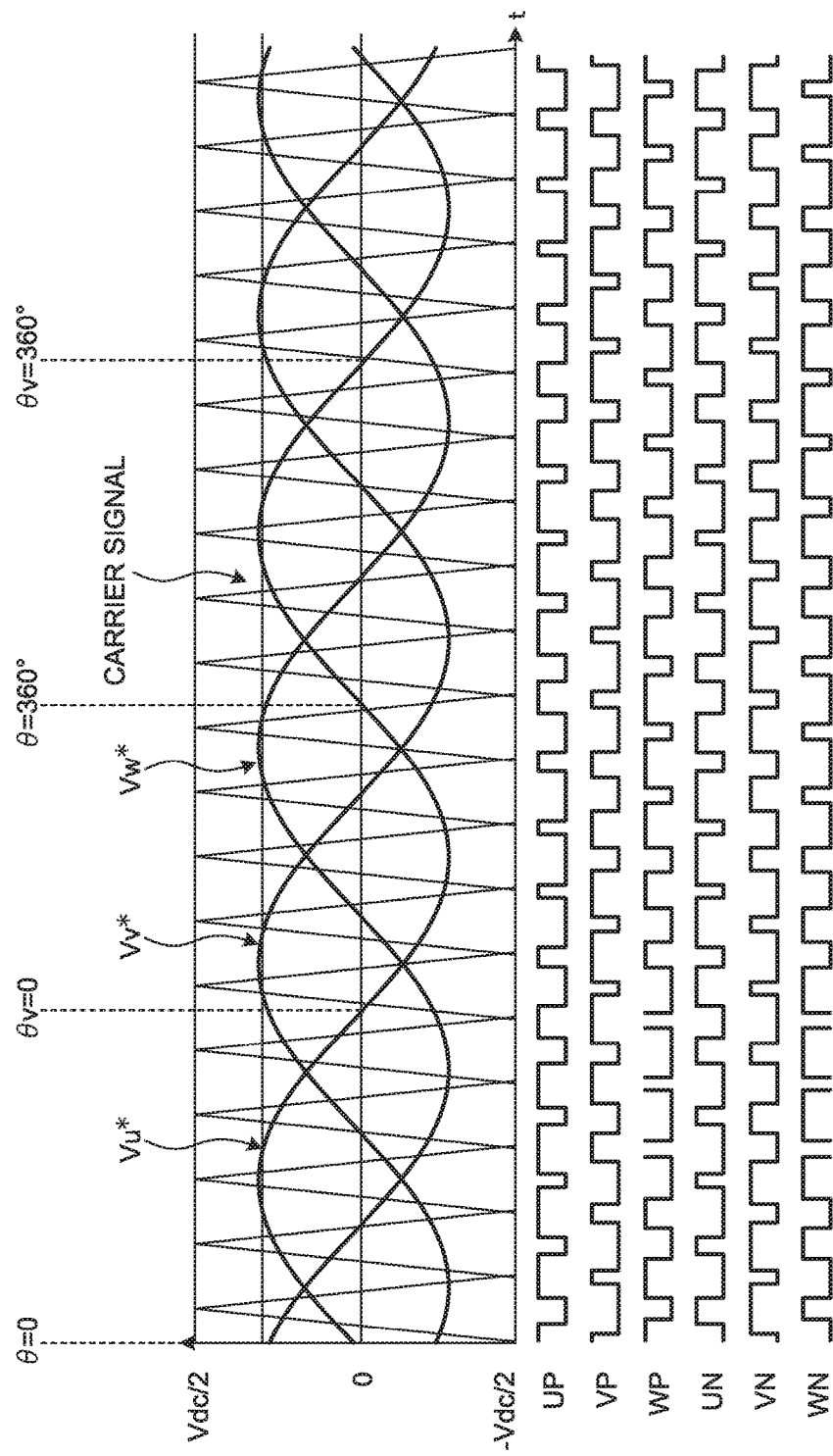
FIG. 3 is an explanatory waveform diagram of an operation of the motor control unit according to embodiment.

FIG. 2 is a block diagram illustrating a configuration of the motor control unit 9 according to the present embodiment. FIG. 3 is an explanatory waveform diagram of the operation of the motor control unit 9 according to the present embodiment.

In FIG. 2, a current restoring unit 11 restores the phase currents Iu, Iv, and Iw flowing to the motor 3 on the basis of information of an output Idc of the current detecting unit 8. When the phase currents Iu, Iv, and Iw flowing to the motor 3 are directly detected, it is unnecessary to restore these phase currents by the current restoring unit 11.

On the basis of the restored Iu, Iv, and Iw and a rotor magnetic-pole position θ of the motor 3, a three-phase to two-phase converting unit 12 generates electric currents Id and Iq on the d-q coordinate axes, that is, a d-axis current on the d-axis coordinate and a q-axis current on the q-axis coordinate by coordinate conversion, and outputs the electric currents Id and Iq to a position and velocity estimating unit 13 and to a current control unit 15. The rotor magnetic-pole position θ is generated by the position and velocity estimating unit 13.

On the basis of the electric currents Id and Iq and voltage commands Vd* and Vq*, the position and velocity estimating unit 13 generates and outputs a motor-velocity estimated value ω to a velocity control unit 14. The voltage commands Vd* and Vq* are generated by the current control unit 15.

On the basis of a velocity command value ω* and the velocity estimated value ω, the velocity control unit 14 calculates a q-axis current command Iq* such that the velocity estimated value ω corresponds with the velocity command value ω* and outputs the q-axis current command Iq* to the current control unit 15.

The current control unit 15 generates a d-axis voltage command Vd* such that the d-axis current Id corresponds with a d-axis current command Id*, generates a q-axis voltage command Vq* such that the q-axis current Iq corresponds with the q-axis current command Iq*, and outputs these d-axis voltage command Vd* and q-axis voltage command Vq* to a voltage-command calculating unit 16.

On the basis of the voltage Vdc detected by the direct-current-voltage detecting unit 7, the d-axis voltage command Vd*, the q-axis voltage command Vq*, and the rotor magnetic-pole position θ, the voltage-command calculating unit 16 generates the UVW-phase voltage commands Vu*, Vv*, and Vw*, that is, a U-phase voltage command Vu*, a V-phase voltage command Vv*, and a W-phase voltage command Vw* as well as the voltage phase θv, and outputs these elements to the synchronous PWM control unit 10. The motor control unit 9 is publicly known as described in Non Patent Literature 1 listed above. Therefore, detailed descriptions thereof are omitted here. It is apparent that any control technique can be used as long as the motor 3 can be driven by the technique.

At the upper section of FIG. 3, the UVW-phase voltage commands Vu*, Vv*, and Vw* generated by the voltage-command calculating unit 16 are illustrated as an example. A carrier signal (sometimes simply referred to as "carrier") illustrated by a triangular wave and the voltage commands Vu*, Vv*, and Vw* are compared by the synchronous PWM control unit 10 and thereby the PWM signals UP, VP, WP, UN, VN, and WN illustrated at the lower section of FIG. 3 are generated. A specific method for generating the PWM signals UP, VP, WP, UN, VN, and WN is described later. In the example in FIG. 3, the zero-cross point at which the U-phase voltage command Vu* falls is defined as a reference point of the voltage phase θv=0. However, the reference point is not limited thereto. It is possible that any point is defined as a reference point of the voltage phase θv=0.

Figure 4:
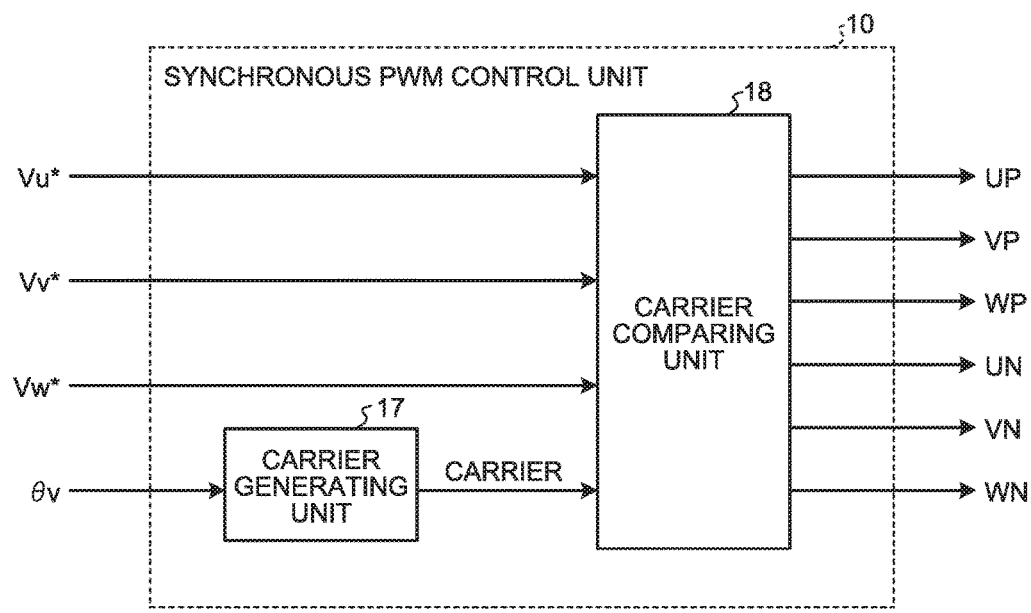
FIG. 4 is a block diagram illustrating a configuration of a synchronous PWM control unit according to the embodiment.

FIG. 4 is a block diagram illustrating a configuration of the synchronous PWM control unit 10 according to the present embodiment. As illustrated in FIG. 4, the synchronous PWM control unit 10 is configured by including a carrier generating unit 17 and a carrier comparing unit 18. The carrier generating unit 17 generates a carrier on the basis of the voltage phase θv. The carrier comparing unit 18 generates the PWM signals UP, VP, WP, UN, VN, and WN on the basis of the carrier signal and the voltage commands Vu*, Vv*, and Vw*.

Figure 5:
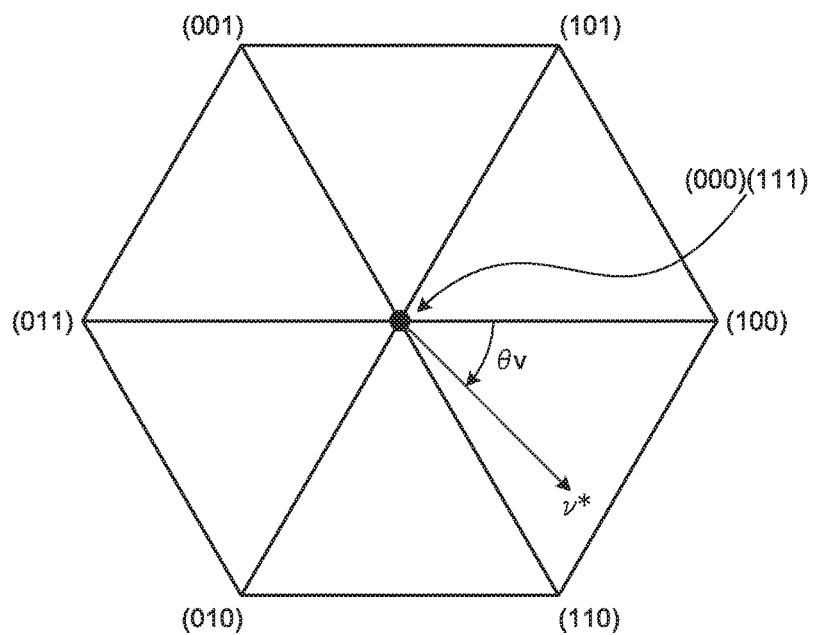
FIG. 5 is a schematic diagram illustrating a relation between an inverter output-voltage vector and a state of respective phase upper-arm switching elements in a space-vector modulation method.
Figures 6, 7:
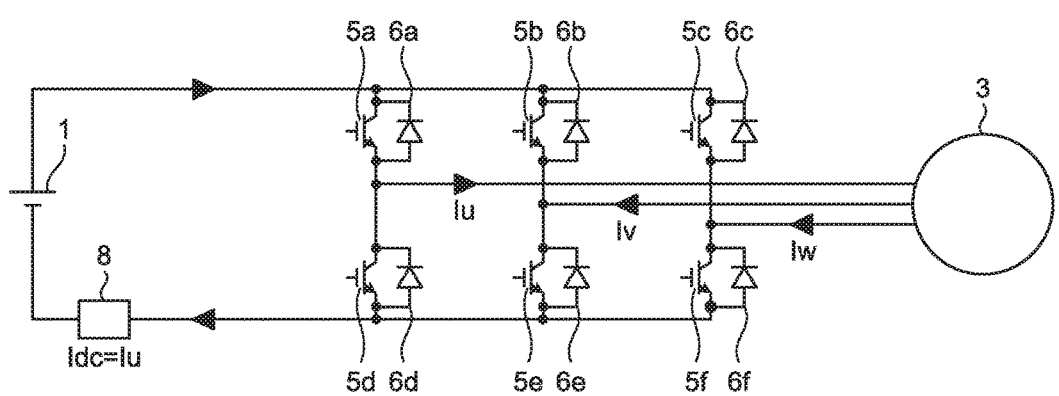
FIG. 6 is a chart illustrating the definition of inverter output-voltage vectors.
FIG. 7 is a circuit diagram illustrating an electric current that flows through relevant parts of an inverter when a real vector V1 (100) is applied.

Next, a space-vector modulation method for generating driving signals based on the PWM modulation to drive the switching elements of the phases is described. FIG. 5 is a schematic diagram illustrating a relation between an inverter output-voltage vector and an on-state or off-state of upper-arm switching elements 5a, 5b, and 5c of the phases in the space-vector modulation method. FIG. 6 is a chart illustrating the definition of the inverter output-voltage vectors. In FIG. 5 and FIG. 6, regarding the upper-arm switching elements 5a, 5b, and 5c of the phases, an on-state is represented as "1" in which an upper-arm switching element is on, and an off-state is represented as "0" in which an upper-arm switching element is off. The inverter output-voltage vector is a vector that indicates an output voltage to be applied to the inverter 2 in a vector space (a vector space illustrated by using real vectors described later) in the space-vector modulation method.

As illustrated in FIG. 5, there are two patterns to indicate the state of each of the upper-arm switching elements of the phases that are "1" indicating an on-state and "0" indicating an off-state. There are eight patterns to indicate an inverter output-voltage vector in a form ("the state of the U-phase upper-arm switching element 5a", "the state of the V-phase upper-arm switching element 5b", and "the state of the W-phase upper-arm switching element 5c") corresponding to a combination of the on-state and the off-state of the upper-arm switching elements 5a, 5b, and 5c of the phases. These eight patterns are V0 (000), V1 (100), V2 (010), V3 (001), V4 (110), V5 (011), V6 (101), and V7 (111). Among these inverter output-voltage vectors, the vectors V0 (000) and V7 (111) with no magnitude are referred to as "zero vector", while the other vectors V1 (100), V2 (010), V3 (001), V4 (110), V5 (011), and V6 (101) with equal magnitude are referred to as "real vector". A phase difference is 60° from each other between adjacent ones of the other vectors.

The inverter control unit 4 merges these zero vectors V0 and V7 and real vectors V1 to V6 in any combination, and appropriately generates driving signals of three-phase PWM voltages (hereinafter, "PWM signal" as needed) corresponding to the upper-arm and lower-arm switching elements of the phases.

Next, a calculation method of the phase currents Iu, Iv, and Iw in the motor driving device 30 according to the present embodiment is described.

FIG. 7 is a diagram illustrating an electric current that flows through relevant parts of the inverter 2 when the real vector V1 (100) is applied as an inverter output-voltage vector. In the example illustrated in FIG. 7, an electric current that flows from the inverter 2 to the motor 3 is represented as a positive current, while an electric current that flows from the motor 3 to the inverter 2 is represented as a negative current. In examples illustrated in the following diagrams, an electric current is represented in the same manner as in FIG. 7.

As illustrated in FIG. 7, when the real vector V1 (100) is applied, the U-phase current Iu flows from the positive-voltage side of the direct-current power supply 1 through the U-phase upper-arm switching element 5a toward the motor 3. The V-phase current Iv flows from the motor 3 through the V-phase lower-arm switching element 5e and the current detecting unit 8 toward the negative-voltage side of the direct-current power supply 1. The W-phase current Iw flows from the motor 3 through the W-phase lower-arm switching element 5f and the current detecting unit 8 toward the negative-voltage side of the direct-current power supply 1. At this time, a relation between the output Idc of the current detecting unit 8 and the motor current is expressed as the following equation (1).

$$Idc=-(Iv+Iw)=Iu \tag{1}$$

That is, when the real vector V1 (100) is applied as an inverter output-voltage vector, a U-phase motor current Iu can be detected from the output Idc of the current detecting unit 8.

Figure 8:
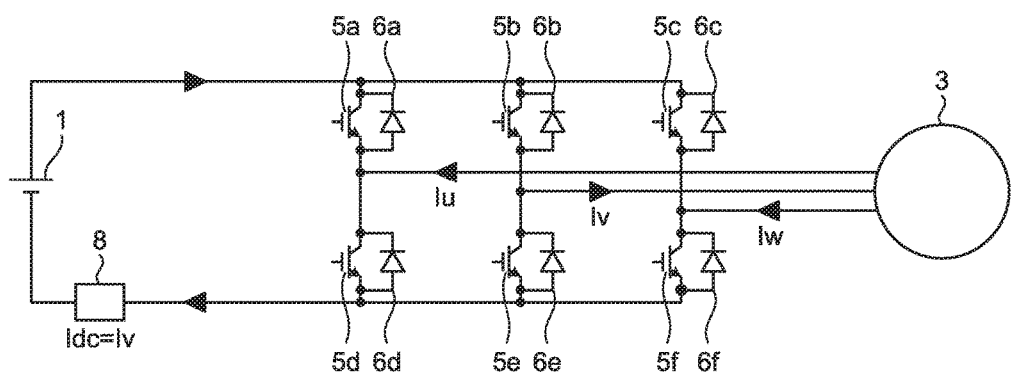
FIG. 8 is a circuit diagram illustrating an electric current that flows through relevant parts of the inverter when a real vector V2 (010) is applied.

FIG. 8 is a diagram illustrating an electric current that flows through relevant parts of the inverter 2 when the real vector V2 (010) is applied as an inverter output-voltage vector.

As illustrated in FIG. 8, when the real vector V2 (010) is applied, the V-phase current Iv flows from the positive-voltage side of the direct-current power supply 1 through the V-phase upper-arm switching element 5b toward the motor 3. The U-phase current Iu flows from the motor 3 through the U-phase lower-arm switching element 5d and the current detecting unit 8 toward the negative-voltage side of the direct-current power supply 1. The W-phase current Iw flows from the motor 3 through the W-phase lower-arm switching element 5f and the current detecting unit 8 toward the negative-voltage side of the direct-current power supply 1. At this time, a relation between the output Idc of the current detecting unit 8 and the motor current is expressed as the following equation (2).

$$Idc=-(Iu+Iw)=Iv \tag{2}$$

That is, when the real vector V2 (010) is applied as an inverter output-voltage vector, a V-phase motor current Iv can be detected from the output Idc of the current detecting unit 8.

Figure 9:
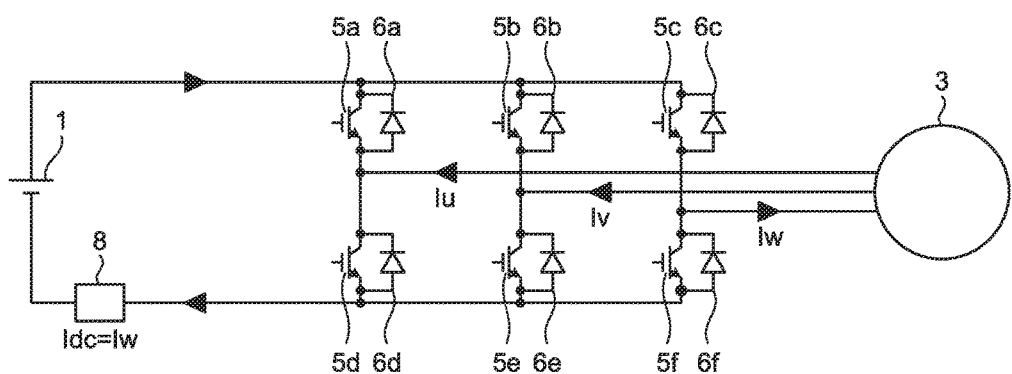
FIG. 9 is a circuit diagram illustrating an electric current that flows through relevant parts of the inverter when a real vector V3 (001) is applied.

FIG. 9 is a diagram illustrating an electric current that flows through relevant parts of the inverter 2 when the real vector V3 (001) is applied as an inverter output-voltage vector.

As illustrated in FIG. 9, when the real vector V3 (001) is applied, the W-phase current Iw flows from the positive-voltage side of the direct-current power supply 1 through the W-phase upper-arm switching element 5c toward the motor 3. The U-phase current Iu flows from the motor 3 through the U-phase lower-arm switching element 5d and the current detecting unit 8 toward the negative-voltage side of the direct-current power supply 1. The V-phase current Iv flows from the motor 3 through the V-phase lower-arm switching element 5e and the current detecting unit 8 toward the negative-voltage side of the direct-current power supply 1. At this time, a relation between the output Idc of the current detecting unit 8 and the motor current is expressed as the following equation (3).

$$Idc=-(Iu+Iv)=Iw \tag{3}$$

That is, when the real vector V3 (001) is applied to the inverter 2 as an output-voltage vector, a W-phase motor current Iw can be detected from the output Idc of the current detecting unit 8.

Figure 10:
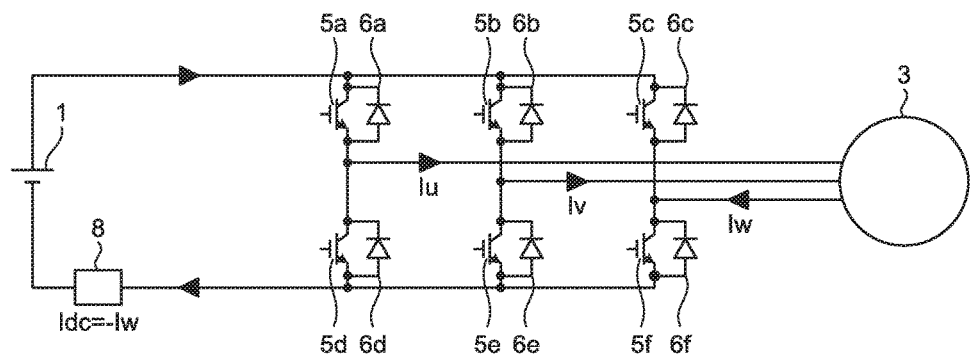
FIG. 10 is a circuit diagram illustrating an electric current that flows through relevant parts of the inverter when a real vector V4 (110) is applied.

FIG. 10 is a diagram illustrating an electric current that flows through relevant parts of the inverter 2 when the real vector V4 (110) is applied as an inverter output-voltage vector.

As illustrated in FIG. 10, when the real vector V4 (110) is applied, the U-phase current Iu flows from the positive-voltage side of the direct-current power supply 1 through the U-phase upper-arm switching element 5a toward the motor 3. The V-phase current Iv flows from the positive-voltage side of the direct-current power supply 1 through the V-phase upper-arm switching element 5b toward the motor 3. The W-phase current Iw flows from the motor 3 through the W-phase lower-arm switching element 5f and the current detecting unit 8 toward the negative-voltage side of the direct-current power supply 1. At this time, a relation between the output Idc of the current detecting unit 8 and the motor current is expressed as the following equation (4).

$$Idc=Iu+Iv=-Iw \tag{4}$$

That is, when the real vector V4 (110) is applied as an inverter output-voltage vector, the W-phase motor current Iw can be detected from the output Idc of the current detecting unit 8.

Figure 11:
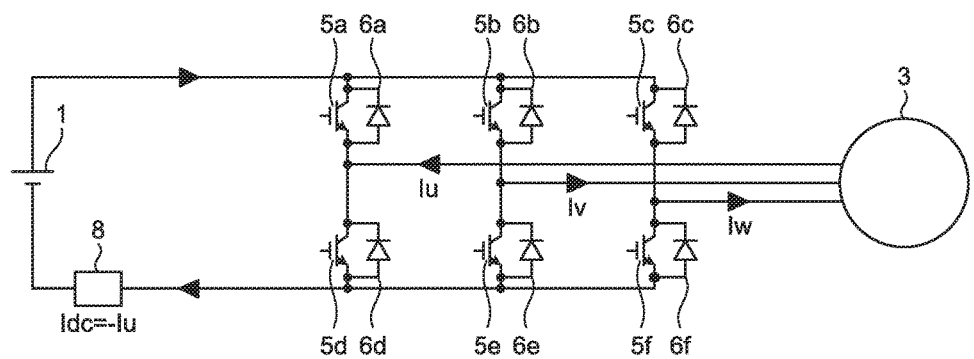
FIG. 11 is a circuit diagram illustrating an electric current that flows through relevant parts of the inverter when a real vector V5 (011) is applied.

FIG. 11 is a diagram illustrating an electric current that flows through relevant parts of the inverter 2 when the real vector V5 (011) is applied as an inverter output-voltage vector.

As illustrated in FIG. 11, when the real vector V5 (011) is applied, the V-phase current Iv flows from the positive-voltage side of the direct-current power supply 1 through the V-phase upper-arm switching element 5b toward the motor 3. The W-phase current Iw flows from the positive-voltage side of the direct-current power supply 1 through the W-phase upper-arm switching element 5c toward the motor 3. The U-phase current Iu flows from the motor 3 through the U-phase lower-arm switching element 5d and the current detecting unit 8 toward the negative-voltage side of the direct-current power supply 1. At this time, a relation between the output Idc of the current detecting unit 8 and the motor current is expressed as the following equation (5).

$$Idc=Iv+Iw=-Iu \tag{5}$$

That is, when the real vector V5 (011) is applied as an inverter output-voltage vector, the U-phase motor current Iu can be detected from the output Idc of the current detecting unit 8.

Figure 12:
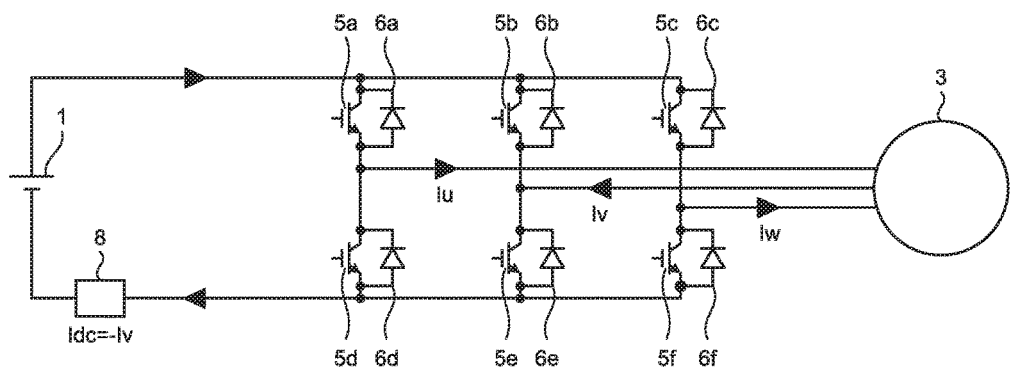
FIG. 12 is a circuit diagram illustrating an electric current that flows through relevant parts of the inverter when a real vector V6 (101) is applied.

FIG. 12 is a diagram illustrating an electric current that flows through relevant parts of the inverter 2 when the real vector V6 (101) is applied as an inverter output-voltage vector.

As illustrated in FIG. 12, when the real vector V6 (101) is applied, the U-phase current Iu flows from the positive-voltage side of the direct-current power supply 1 through the U-phase upper-arm switching element 5a toward the motor 3. The W-phase current Iw flows from the positive-voltage side of the direct-current power supply 1 through the W-phase upper-arm switching element 5c toward the motor 3. The V-phase current Iv flows from the motor 3 through the V-phase lower-arm switching element 5e and the current detecting unit 8 toward the negative-voltage side of the direct-current power supply 1. At this time, a relation between the output Idc of the current detecting unit 8 and the motor current is expressed as the following equation (6).

$$Idc=Iu+Iw=-Iv \tag{6}$$

That is, when the real vector V6 (101) is applied as an inverter output-voltage vector, the W-phase motor current Iv can be detected from the output Idc of the current detecting unit 8.

In the manner as described above, the motor driving device 30 according to the present embodiment can detect the phase motor currents from the output Idc of the current detecting unit 8 when the real vectors V1 to V6 are applied. However, in a case with the zero vectors V0 (000) and V7 (111), an electric current does not flow through the current detecting unit 8. Thus, the motor driving device 30 cannot detect the phase motor currents.

Figure 13:
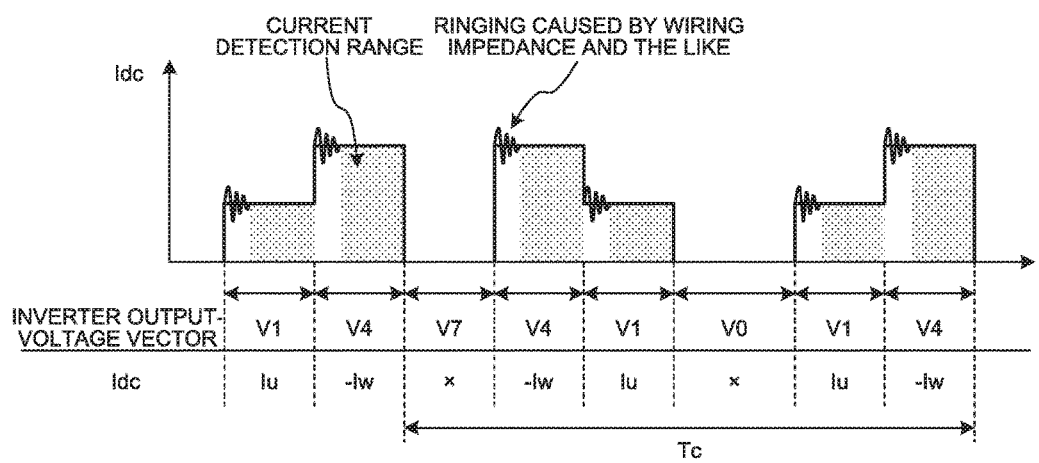
FIG. 13 is a waveform diagram illustrating a relation between an output Idc of a current detecting unit and a vector sequence when a vector rotation angle θe falls within the range $0° \leq θe < 60°$.

Next, a relation between a rotation angle θe of the inverter output-voltage vector and a current detection phase in the single-shunt current detecting method is described. FIG. 13 is a waveform diagram illustrating a relation between the output Idc of the current detecting unit 8 and an output sequence of the inverter output-voltage vectors (hereinafter, "vector sequence") when the rotation angle θe of the inverter output-voltage vector falls within the range 0°·θe<60°. The rotation angle θe of the inverter output-voltage vector is a phase angle with reference to the valley (bottom) or the peak (top) of the carrier. In the following descriptions, "the rotation angle of the inverter output-voltage vector" is abbreviated as "vector rotation angle".

When the vector rotation angle θe falls within the range 0°≤θe<60°, the vector is positioned between the real vector V1 (100) and the real vector V4 (110) as illustrated in FIG. 5. In the descriptions here and below, the real vector V1 (100) is used as a reference vector as illustrated in FIG. 5. However, the reference vector may be changed to another real vector.

In FIG. 13, a voltage is applied to the inverter 2 in the order described as V0 (000)→V1 (100)→V4 (110)→V7 (111)→V4 (110)→V1 (100)→V0 (000).

During a switching cycle Tc of the inverter 2, an equivalent inverter output-voltage vector is generated by changing the allocation of time for outputting V0 (000), V7 (111), V1 (100), and V4 (110). While a three-phase modulation method is used in FIG. 13, a two-phase modulation method may be employed. As described above, when the inverter output-voltage vector is a real vector, that is, the real vectors V1 (100) and V4 (110) in the example in FIG. 13, it is possible to detect the phase motor currents from the output Idc of the current detecting unit 8.

Meanwhile, immediately after the inverter output voltage is changed over, a ringing appears in the current waveform as illustrated in FIG. 13 due to the influence of an inductance component of the motor 3 and a parasitic inductance component of a circuit-board pattern (hereinafter, "wiring impedance and the like"). Thus, there is a high possibility that the original phase motor currents cannot be restored on the basis of the output Idc detected during the period for which a ringing appears. Therefore, a method is often employed in which detection of the output Idc is prohibited for a certain period of time and the output Idc is detected at the timing when the current waveform becomes stable. FIG. 13 illustrates an example in which a hatched section is defined as a current detection range. The motor currents are restored on the basis of the output Idc detected in this period.

Figure 14:
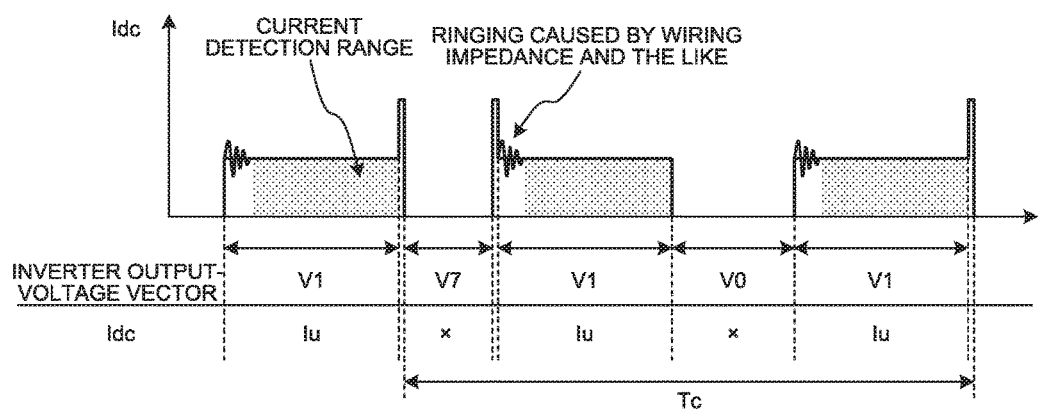
FIG. 14 is a waveform diagram illustrating a relation between the output Idc of the current detecting unit and a vector sequence when the vector rotation angle θe is $θe \cong 0°$.

FIG. 14 is a diagram illustrating a relation between the output Idc of the current detecting unit 8 and the vector sequence when the vector rotation angle θe is θe≅0°. When θe≅0° is satisfied, an inverter output-voltage vector v* becomes close to the real vector V1 (100) as it is clear with reference to FIG. 5. Thus, in the inverter output-voltage pattern, the real vector V1 (100) is applied for a longer period, while the real vector V4 (110) is narrowed. Further, where θe=0° is satisfied, the real vector V4 (110) is eliminated. Therefore, where θe=0° is satisfied, even though the inverter output-voltage pattern is in an optimal state in which a ringing does not appear which can be caused by the wiring impedance and the like, only the U-phase motor current Iu can be restored on the basis of the output Idc of the current detecting unit 8. This case causes a more significant estimation error in the position and velocity estimating unit 13 illustrated in FIG. 2, and thus there is a concern about degradation in controllability.

In FIG. 14, the case where θe=0° is satisfied is described as a typical example. However, when the inverter output-voltage vector v* overlaps with the real vector V1 (100), V2 (010), V3 (001), V4 (110), V5 (011), or V6 (101), that is, when the vector rotation angle θe satisfies the following equation (7), this results in a problem in that a motor current for only one certain phase can be restored.

$$\theta e = 60 \times n \ (n \text{ is an integer that satisfies } n=0,1,\ldots,5) \quad (7).$$

The basic configuration and operation of the motor driving device according to the present embodiment have been described above along with the problems in the single-shunt current detection method. Next, a method for the solution to these problems is described. This method uses synchronous PWM control.

Figure 15:
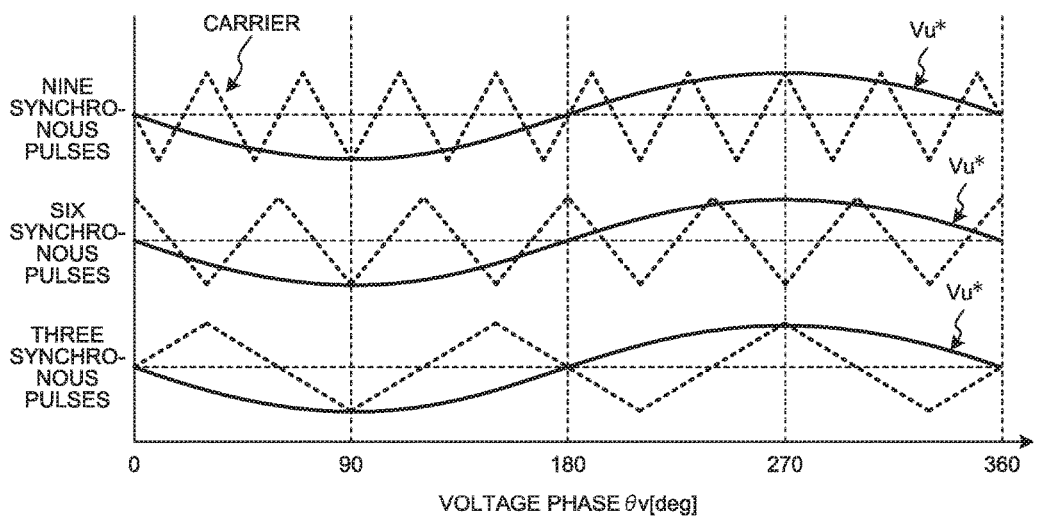
FIG. 15 is a waveform diagram illustrating a relation between a carrier and a voltage command in synchronous PWM control.

FIG. 15 is a waveform diagram illustrating a relation between a carrier and the voltage command Vu* in the synchronous PWM control. In FIG. 15, the horizontal axis represents the voltage phase θv, while the vertical axis represents, from the bottom, a waveform of the carrier and a waveform of the voltage command Vu* in a case where control is performed with three synchronous pulses, those waveforms in a case where the inverter 2 is controlled by the inverter control unit 4 with six synchronous pulses, and those waveforms in a case where control is performed with nine synchronous pulses.

In a case of the synchronous PWM control, a generated carrier is synchronized with the voltage phase θv as illustrated in FIG. 15. That is, the carrier generating unit 17 generates a carrier synchronized with the voltage phase θv. At this time, the carrier comparing unit 18 compares the magnitude between the carrier and the voltage command Vu* and outputs a "High" or "Low" PWM signal. An example of the PWM signal is as illustrated at the lower section of FIG. 3.

The synchronous PWM control unit 10 controls the frequency of a triangular-wave carrier so as to become, for example, three times, six times, and nine times the frequency of the U-phase voltage command Vu*. As the carrier frequency is changed to become three times, six times, and nine times the U-phase voltage command Vu*, PWM signals are generated respectively in which the number of pulses included in half the carrier cycle is three, six, and nine. Because the carrier and the voltage phase θv are synchronized with each other, their pulses are referred to as "three synchronous pulses", "six synchronous pulses", and "nine synchronous pulses". Although not illustrated in FIG. 15, it is also possible to set the carrier frequency to become nine or more times the U-phase voltage command Vu*, that is, to control the frequency of the PWM signal so as to become 3n-times (n is an integer) the frequency of an alternating-current voltage. However, because the number of pulses in the PWM signal is increased per cycle of the voltage command Vu*, the output-voltage accuracy is improved, while the number of times of switching the switching elements 5a to 5f is increased. That is, an increase in carrier frequency leads to an increase in switching loss. Thus, there is a trade-off relation between an increase in carrier frequency and an increase in switching loss.

Figure 16A:
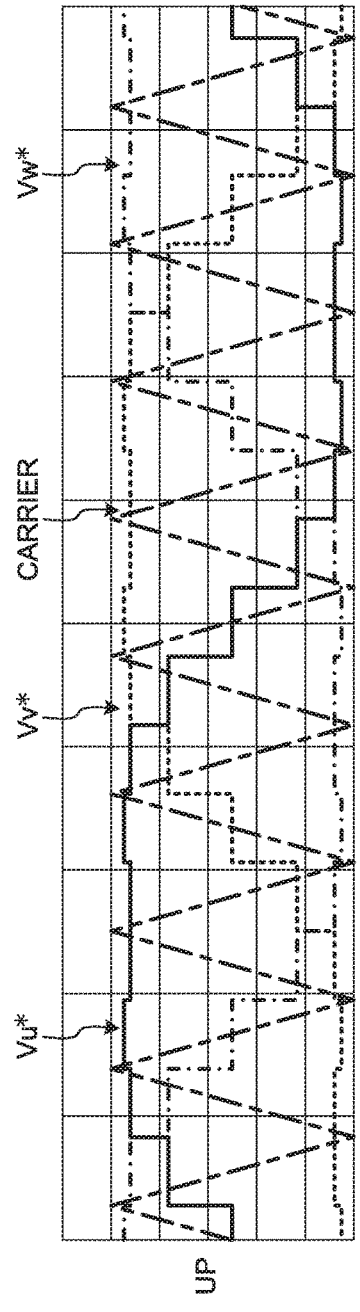
FIGS. 16A, 16B and 16C are waveform diagrams illustrating operation waveforms of a carrier, voltage commands, PWM signals, and line-to-line voltages applied to a motor when the inverter is operated by the inverter control unit with nine pulses.
Figure 16B:
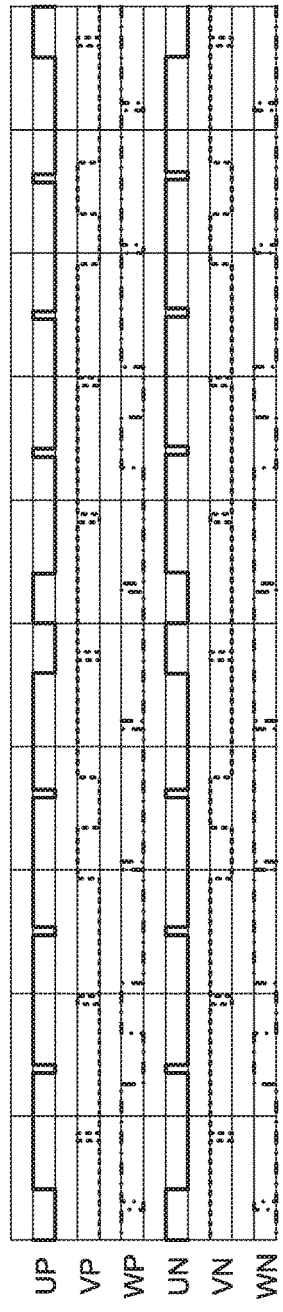
Figure 16C:
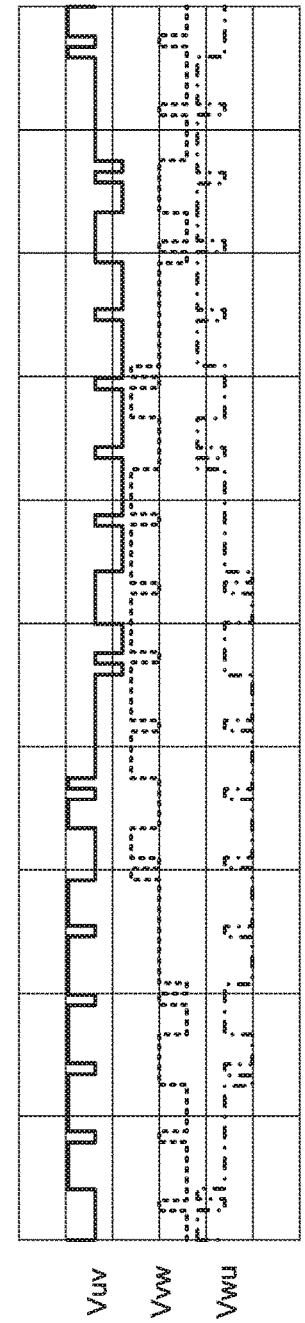

FIGS. 16A, 16B and 16C show waveform diagrams illustrating operation waveforms of a carrier, the voltage commands Vu*, Vv*, and Vw*, the PWM signals UP, VP, WP, UN, VN, and WN, and line-to-line voltages Vuv, Vvw, and Vwu applied to the motor 3 when the inverter 2 is operated by the inverter control unit 4 with synchronous nine pulses. In FIG. 16, it is assumed that the operation is controlled by using a microcomputer that is actually used to configure the inverter control unit 4. Thus, while the voltage command Vu* operates continuously in FIG. 3, the voltage command Vu* operates so as to vary discretely in FIGS. 16A, 16B and 16C because the voltage command Vu* is controlled at the timing of the carrier peaks (top) and valleys (bottom).

The waveform of the voltage command Vu* illustrated in FIG. 16A is set to include nine carrier cycles per cycle of the voltage command Vu*. The magnitude is compared between the carrier and the voltage command Vu*. For example, when the voltage command Vu* is higher than the carrier, the PWM signal UP is output as "High", while when the voltage command Vu* is lower than the carrier, the PWM signal UP is output as "Low". The PWM signal UN is controlled so as to become opposite to the PWM signal UP. Similarly, the magnitude is compared between the carrier and the voltage command Vv* and between the carrier and the voltage command Vw*. On the basis of the comparison results, the PWM signals VP, WP, VN, and WN are generated as illustrated in FIG. 16B. The switching elements 5a to 5f are driven by the generated PWM signals. The line-to-line voltages Vuv, Vvw, and Vwu as illustrated in FIG. 16C are applied to the motor 3.

Recently, in order to increase the output voltage in motor driving, a space-vector modulation PWM method and a third harmonic superposition PWM method are also widely used. Therefore, while the voltage command Vu* is treated as a sine wave in FIG. 3 and FIG. 15, in the present embodiment, as illustrated by a solid line, a dotted line, and a dot-and-dash line in FIG. 16A, the voltage commands Vu*, Vv*, and Vw* are treated as waveforms similar to the space-vector modulation PWM. It is clear with reference to the waveforms in FIGS. 16B and 16C that waveforms equivalent to the waveforms illustrated at the lower section of FIG. 3 are generated and thus it is allowable that a voltage command that varies discretely is used to generate the voltage commands Vu*, Vv*, and Vw*.

FIG. 17 is a waveform diagram illustrating a relation between the vector rotation angle θe and a carrier when the inverter 2 is operated by the inverter control unit 4 with synchronous nine pulses. In FIG. 17, on the assumption of discrete-data digital control using a microcomputer, motor control calculation is performed in synchronization with the carrier peaks and valleys. Thus, the vector rotation angle θe is updated at the career peaks and valleys. In FIG. 17, a valley of the carrier is defined as a control reference. A phase difference in the vector rotation angle θe relative to the carrier is set to zero. Further, the carrier and the inverter output-voltage vector v* are synchronized with each other. In FIG. 17, it is assumed that the carrier frequency is nine times the frequency of the voltage commands Vu*, Vv*, and Vw*. However, the carrier frequency is not limited to being nine times more frequent. It is sufficient that the carrier cycle has a frequency which is an integer multiple of three, such as three times, six times, nine times, . . . more frequent than the vector rotation angle θe.

The vector rotation angle θe[j] at a given number of controls j (0≤j<17) can be expressed as the following equation (8).

$$\theta e[j] = 360 \times j/18 \qquad (8)$$

In the equation (8), where j equals to 3, 6, 9, 12, and 15, the vector rotation angle θe[j] becomes a value that satisfies the equation (7). Therefore, when j equals to 3, 6, 9, 12, and 15, a motor current for only one phase can be detected.

In the above descriptions, the carrier frequency is assumed to be nine times the frequency of the voltage commands Vu*, Vv*, and Vw* in the single-rotation cycle of the inverter output-voltage vector v*. In the following descriptions, a case is described in which conditions are generalized.

When the carrier frequency is set N times (N=3(k+1), k=0, 1, 2, . . . ) the frequency of the inverter output-voltage vector v*, the vector rotation angle θe[j] at a given number of controls j (j is a repeating integer of 0≤j≤m−1, and m represents the number of times of control to be executed per rotation cycle of the voltage command vector, and satisfies 1≤m≤N) is expressed as the following equation (9).

$$\theta e[j] = 360 \times j/m = 60 \times (6 \times j)/m \qquad (9)$$

On the basis of the equation (8), when (j/m) becomes (x/6) (x is an integer equal to 0 to 5), θe[j] satisfies the above equation (7). Thus, a motor current for only one phase can be detected.

Figure 18:
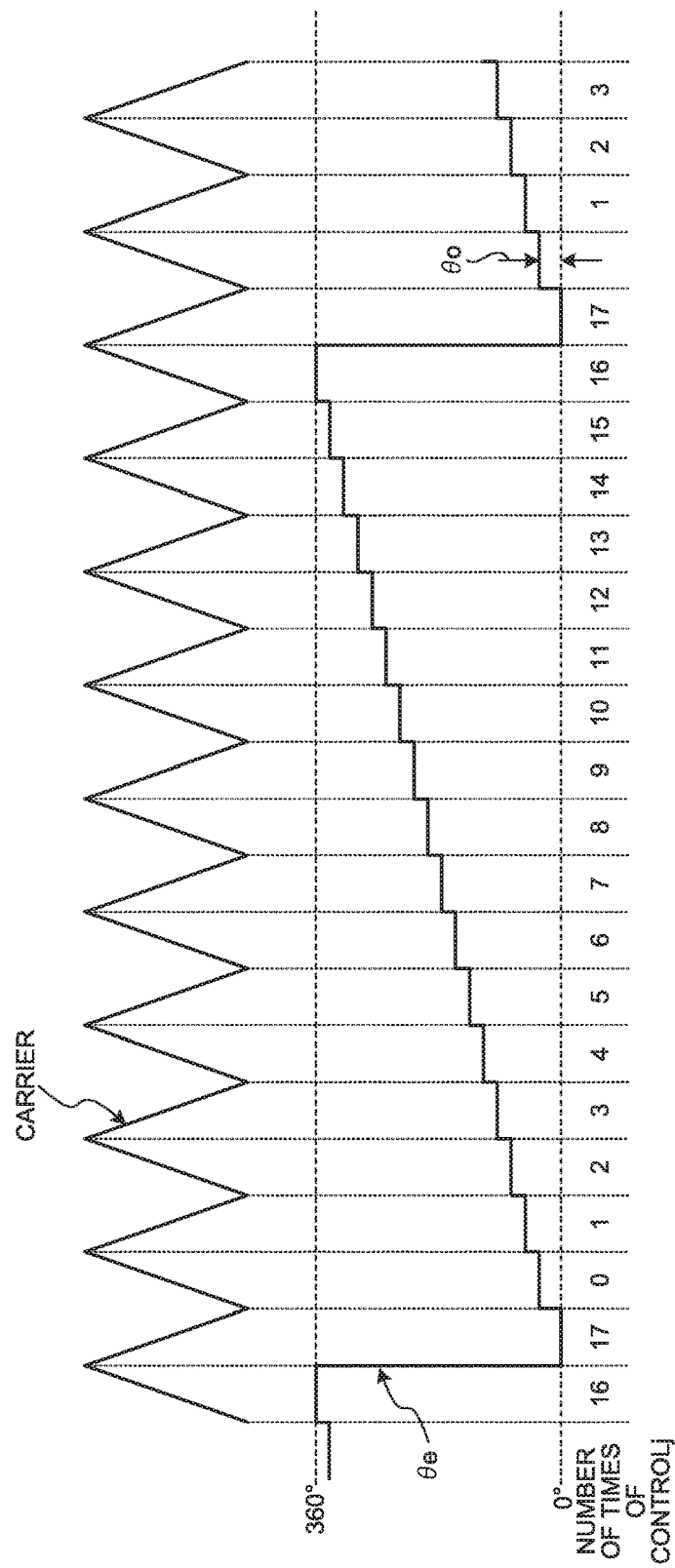
FIG. 18 is a waveform diagram illustrating a relation between a carrier and the vector rotation angle θe when a phase difference is set to the vector rotation angle θe.

In the aforementioned descriptions, the case has been explained in which the vector rotation angle θe does not have an initial phase difference with reference to the carrier valley in the synchronous PWM control. Next, a case is described in which a phase difference θo is set to the vector rotation angle θe with reference to the carrier valley. FIG. 18 is a waveform diagram illustrating a relation between the carrier and the vector rotation angle θe when a phase difference is set to the vector rotation angle θe. Similarly to FIG. 17, FIG. 18 exemplifies a case where the carrier frequency is nine times the frequency of the inverter output-voltage vector v*. However, it is not limited to nine times, but it may be an integer multiple of three times.

When the phase difference θo is set to the vector rotation angle θe, the vector rotation angle θe[j] at a given number of controls j (0≤j<17) can be expressed as the following equation (10).

$$\theta e[j] = 360 \times j/18 \qquad (10)$$
$$= 60 \times \{(6 \times j/18) + (\theta o/60)\}$$

In the equation (10), when θo is set to an appropriate value, the vector rotation angle θe[j] does not satisfy the equation (7). The appropriate value is such a value that θe[j] in the above equation (10) relative to any j does not satisfy the above equation (7). At least when (θo/60) present in the second term on the right side of the equation (10) does not become an integer, that is, when the phase difference θo is not an integer multiple of 60, the vector rotation angle θe[j] does not satisfy the above equation (7).

The equation (10) is applied to the case where the carrier frequency is nine times the frequency of the inverter output-voltage vector v*. Also in a case with the phase difference θo, the following equation where conditions are generalized is used. The following equation (11) expresses the vector rotation angle θe[j] at a given number of controls j (j is a repeating integer of 0≤j≤m−1, and m represents the number of controls to be executed per rotation cycle of the voltage command vector, and satisfies 1≤m≤N) where the carrier frequency is set N times (N=3(k+1), k=0, 1, 2, . . . ) the frequency of the inverter output-voltage vector v*.

$$\theta e[j] = 360 \times j/m + \theta o \qquad (11)$$
$$= 60 \times \{(6 \times j/m) + (\theta o/60)\}$$

By using the equation (11), the phase difference θo is appropriately set even in the case where conditions are generalized, such that the vector rotation angle θe does not satisfy the equation (7). As having been already described for the above equation (10), at least when (θo/60) present in the second term on the right side of the equation (10) does not become an integer, that is, when the phase difference θo is not an integer multiple of 60, the vector rotation angle θe[j] does not satisfy the above equation (7). The phase difference θo is a value determined by a relation with the carrier. The essential point is to set a certain phase difference between the voltage-command phase and the carrier phase, specifically, a specific phase difference that does not satisfy the above equation (11). The amplitude and phase of an alternating-current voltage to be applied to the inverter 2 is determined by the magnitude and phase of a voltage command. Thus, the voltage command may be rephrased as an alternating-current voltage to be applied to the inverter 2.

Figure 19:
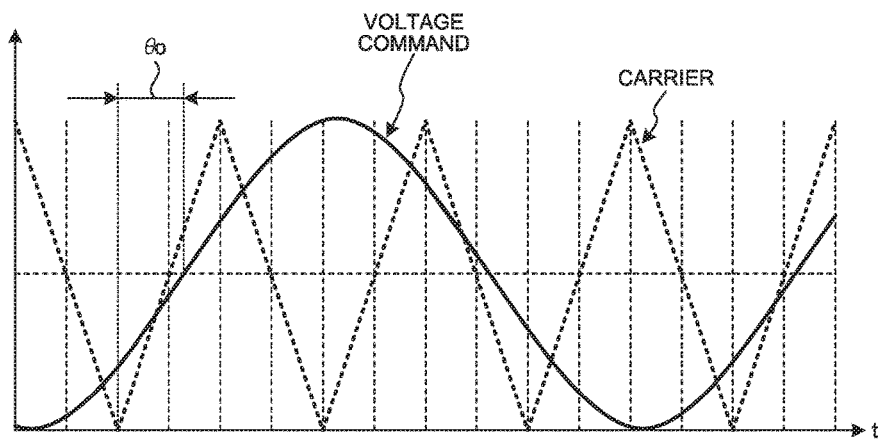
FIG. 19 is a waveform diagram of a carrier and a voltage command when a phase difference is set between the carrier and the voltage command.

FIG. 19 is a waveform diagram of a carrier and a voltage command when a phase difference is set between the carrier and the voltage command. As illustrated in FIG. 19, the voltage command is set such that the phase difference θo is present between the carrier valley (bottom) and the zero-cross point of the voltage command.

In the manner as described above, a phase difference between the carrier and the voltage command is appropriately controlled by using the synchronous PWM control, and thereby electric currents for at least two phases can still be detected even in the single-shunt current detection method. This can suppress degradation in controllability caused by constraints on current detection in the single-shunt current detection method. In the actual motor driving device, there is a detection dead band due to the influence of the ringing as described above. Further, there is a delay time of the current detecting unit 8 itself. Thus, it is difficult to detect motor currents for at least two phases at every control timing point. However, when the method according to the present embodiment is used, the range of the vector rotation angle θe can be extended within which motor currents for at least two phases can be detected. Accordingly, the method according to the present embodiment is also very effective for the actual motor driving device.

The relation between the vector rotation angle θe and the single-shunt current detection method has been described above. Next, a relation between an inverter output-voltage vector and an inverter modulation factor Vk is described.

Figure 20:
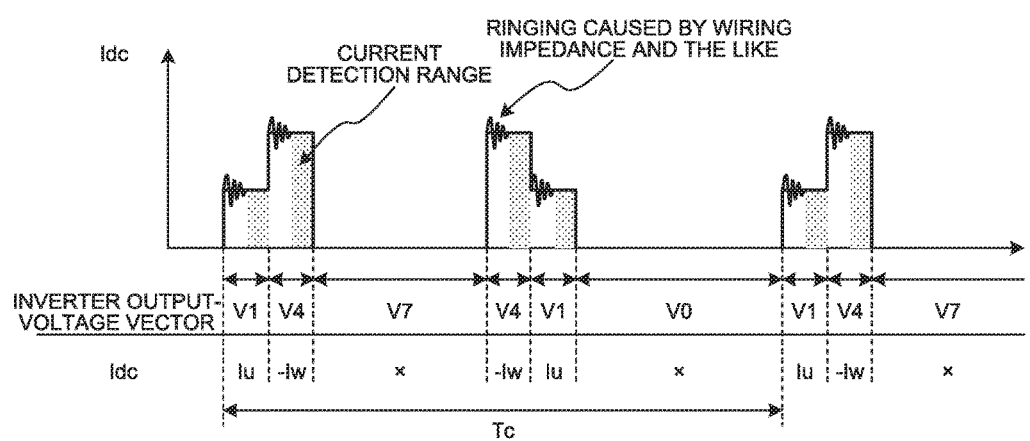
FIG. 20 is a diagram illustrating a relation between the output Idc of the current detecting unit and a vector sequence when the vector rotation angle θe falls within the range $0° \leq θe < 60°$ and an inverter modulation factor is relatively low.

FIG. 20 is a diagram illustrating a relation between the output Idc of the current detecting unit 8 and a vector sequence when the vector rotation angle θe falls within the range 0°≤θe<60° and the inverter modulation factor is relatively low. As it is understood from the comparison between FIG. 20 and FIG. 13, when the modulation factor Vk is lower, the zero vector V0 (000) and V7 (111) are output for a longer time than the real vector V1 (100) and V4 (110). As described above, in the single-shunt current detection method, the respective phase motor currents can be detected only by applying a real vector. Therefore, in a case where the modulation factor Vk is relatively low and a real vector is inevitably output for a relatively short time, it is difficult to detect a motor current. Particularly, this tendency is significant when the current detection prohibition section used as a solution to the ringing is relatively long, or the detection delay time in the current detection unit 8 is relatively long. In contrast, when the method according to the present embodiment is applied, this functions as making the current detection section longer. Thus, the method according to the present embodiment is a very effective technique for the range within which the modulation factor Vk is relatively low.

In the above descriptions, the phase difference θo is set between the carrier and the voltage command to execute the synchronous PWM control. Upon executing the synchronous PWM control, there may be a phase difference as an error between a carrier and a voltage applied to the motor 3. Even in that case, the control method according to the present embodiment having been described above still produces significant effects.

Figure 21:
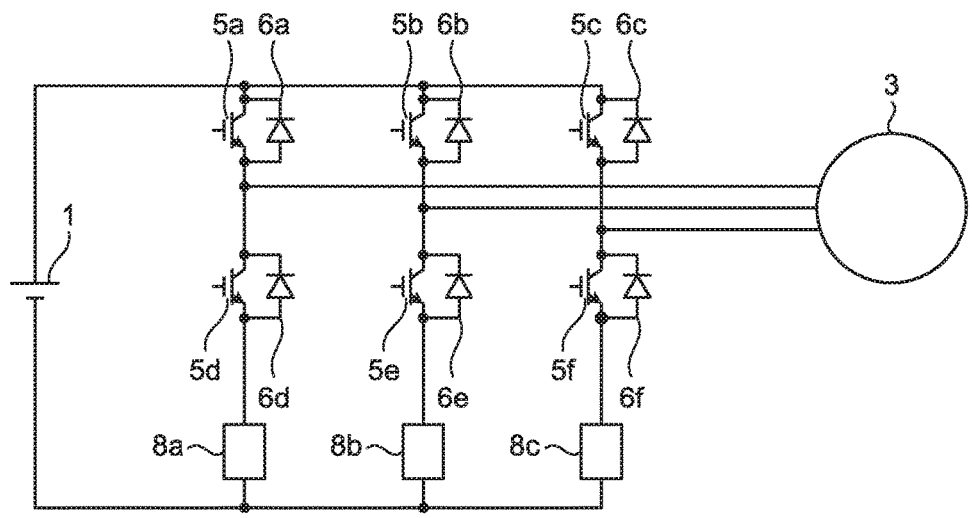
FIG. 21 is a circuit diagram of a triple-shunt current detection method in which three shunt resistances are provided on a side of a negative-potential of respective phase lower-arm switching elements.

The control method according to the present embodiment has been described above on the basis of the single-shunt current detection method. However, the control method according to the present embodiment is also effective in another current detection method in which a detectable load current phase is changed over in accordance with a driven state of switching elements. For example, FIG. 21 is a circuit diagram of a triple-shunt current detection method in which shunt resistances 8a, 8b, and 8c are provided between the respective phase lower-arm switching elements 5d, 5e, and 5f and the negative-potential side of the direct-current power supply 1. Even in the triple-shunt current detection method, it is still necessary to consider the influence of the ringing and the detection delay time in the current detecting unit 8 as described above. Thus, in the triple-shunt current detection method, the same effects as those obtained by using the single-shunt current detection method can be also obtained. In FIG. 21, three shunt resistances are provided. It is also possible that a shunt resistance is provided for at least two of the UVW phases. This configuration can also achieve the effects produced by the control method according to the present embodiment.

Figure 22:
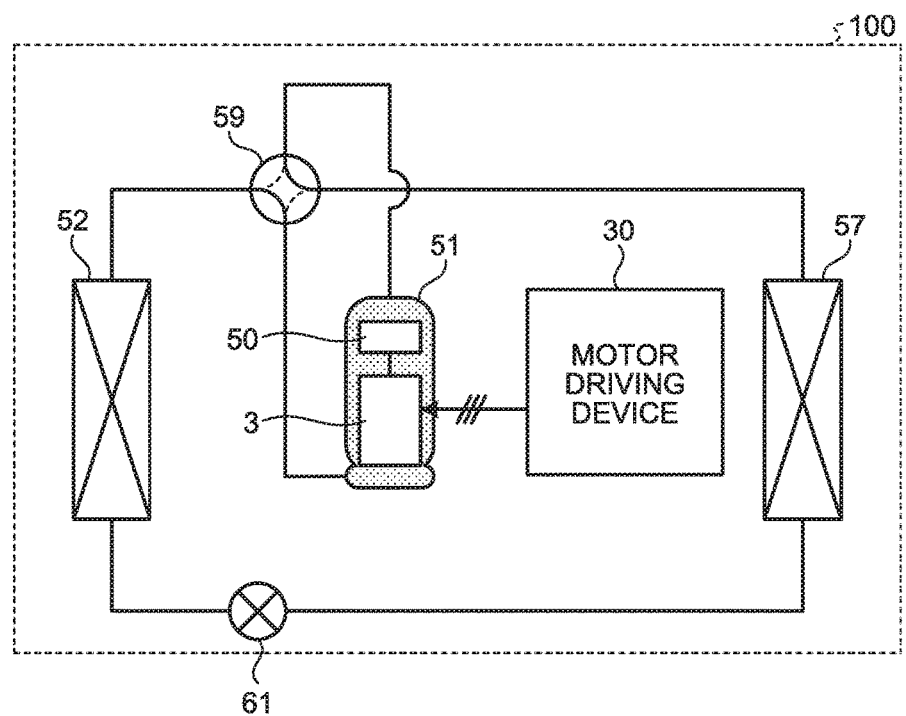
FIG. 22 is a schematic configuration diagram in a case where the motor driving device according to the embodiment is applied to a heat pump device.

Next, an application example of the motor driving device 30 according to the present embodiment is described. FIG. 22 is a schematic configuration diagram in a case where the motor driving device according to the present embodiment is applied to a heat pump device. A heat pump device 100 illustrated in FIG. 22 is configured by connecting a compressor 51 that includes the motor 3 and a compressing mechanism 50, a four-way valve 59, a heat exchanger 52, an expansion mechanism 61, and a heat exchanger 57 sequentially by pipes. The heat pump device 100 is described below in more detail.

Figure 23:
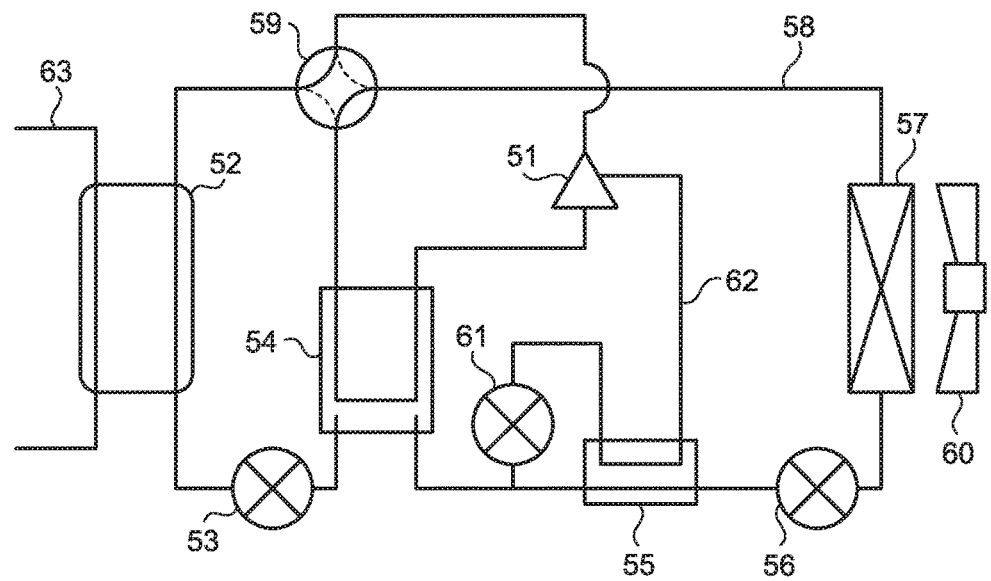
FIG. 23 is a circuit configuration diagram of a heat pump device according to the embodiment.
Figure 24:
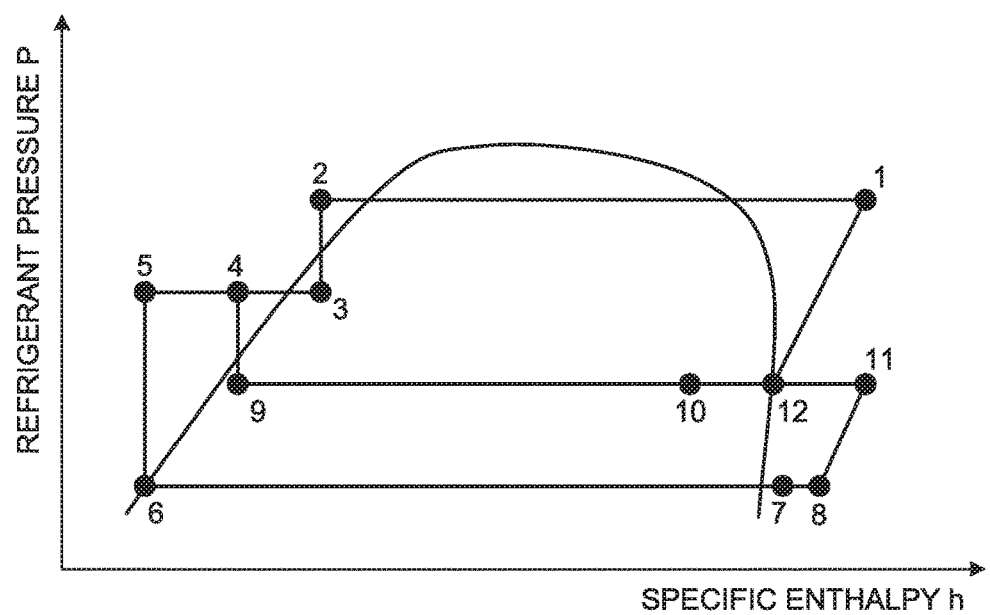
FIG. 24 is a Mollier diagram of a state of a refrigerant of the heat pump device illustrated in FIG. 23.

FIG. 23 is a circuit configuration diagram of the heat pump device 100 according to the present embodiment. FIG. 24 is a Mollier diagram of a state of a refrigerant of the heat pump device 100 illustrated in FIG. 23. In FIG. 24, the horizontal axis indicates the specific enthalpy and the vertical axis indicates the refrigerant pressure.

The heat pump device 100 includes a main refrigerant circuit 58, in which the compressor 51, the heat exchanger 52, an expansion mechanism 53, a receiver 54, an internal heat exchanger 55, an expansion mechanism 56, and the heat exchanger 57 are sequentially connected by pipes and through which a refrigerant circulates. In the main refrigerant circuit 58, the four-way valve 59 is provided on the discharge side of the compressor 51; therefore, the circulation direction of the refrigerant can be switched. A fan 60 is provided near the heat exchanger 57. Furthermore, the heat pump device 100 includes an injection circuit 62 that connects, between the receiver 54 and the internal heat exchanger 55, the internal heat exchanger 55 and an injection pipe of the compressor 51 by pipes. The expansion mechanism 61 and the internal heat exchanger 55 are sequentially connected to the injection circuit 62.

A water circuit 63, in which water is circulated, is connected to the heat exchanger 52. A device that uses water, such as a hot water dispenser and a radiator, examples of which include a radiator and a floor heating, is connected to the water circuit 63.

First, an explanation will be given of an operation of the heat pump device 100 during the heating operation. In the heating operation, the four-way valve 59 is set in the direction of the solid line. The heating operation includes not only heating used for air conditioning but also hot-water supply in which heat is applied to water to make hot water.

The gas-phase refrigerant (at point 1 in FIG. 24) that has become a refrigerant having a high temperature and a high pressure in the compressor 51 is discharged from the compressor 51 and exchanges heat in the heat exchanger 52, which functions as a condenser and a radiator, to be liquefied (at point 2 in FIG. 24). At this point, water circulating in the water circuit 63 is heated by the heat radiated from the refrigerant and is used for heating and hot-water supply.

The liquid-phase refrigerant liquefied in the heat exchanger 52 is decompressed in the expansion mechanism 53 and enters a gas-liquid two-phase state (at point 3 in FIG. 24). The refrigerant that has entered a gas-liquid two-phase state in the expansion mechanism 53 exchanges heat with the refrigerant drawn into the compressor 51 by the receiver 54 so as to be cooled and liquefied (at point 4 in FIG. 24). The liquid-phase refrigerant liquefied in the receiver 54 is divided between the main refrigerant circuit 58 and the injection circuit 62 and flows therein.

The liquid-phase refrigerant flowing in the main refrigerant circuit 58 exchanges heat with the refrigerant flowing in the injection circuit 62, which is decompressed in the expansion mechanism 61 and has entered a gas-liquid two-phase state, in the internal heat exchanger 55 and is further cooled (at point 5 in FIG. 24). The liquid-phase refrigerant cooled in the internal heat exchanger 55 is decompressed in the expansion mechanism 56 and enters a gas-liquid two-phase state (at point 6 in FIG. 24). The refrigerant that has entered a gas-liquid two-phase state in the expansion mechanism 56 exchanges heat with the outside air in the heat exchanger 57, which functions as an evaporator, and is heated (at point 7 in FIG. 24). The refrigerant heated in the heat exchanger 57 is further heated in the receiver 54 (at point 8 in FIG. 24) and is drawn into the compressor 51.

On the other hand, as described above, the refrigerant flowing through the injection circuit 62 is decompressed in the expansion mechanism 61 (at point 9 in FIG. 24) and exchanges heat in the internal heat exchanger 55 (at point 10 in FIG. 24). The refrigerant (injection refrigerant) that has exchanged heat in the internal heat exchanger 55 and is in the gas-liquid two-phase state flows into the compressor 51 from the injection pipe of the compressor 51 while remaining in the gas-liquid two-phase state.

In the compressor 51, the refrigerant drawn in from the main refrigerant circuit 58 (at point 8 in FIG. 24) is compressed to an intermediate pressure and heated (at point 11 in FIG. 24). The injection refrigerant (at point 10 in FIG. 24) joins the refrigerant compressed to the intermediate pressure and heated (at point 11 in FIG. 24), thereby the temperature of the refrigerant decreases (at point 12 in FIG. 24). The refrigerant having the decreased temperature (at point 12 in FIG. 24) is further compressed and heated to have a high temperature and a high pressure, and is discharged (at point 1 in FIG. 24).

When the injection operation is not performed, the aperture of the expansion mechanism 61 is fully closed. In other words, when the injection operation is performed, the aperture of the expansion mechanism 61 is larger than a predetermined aperture. However, when the injection operation is not performed, the aperture of the expansion mechanism 61 is set to be smaller than the predetermined aperture. Accordingly, the refrigerant does not flow into the injection pipe of the compressor 51. The aperture of the expansion mechanism 61 is electronically controlled by a control unit of a microcomputer or the like.

The operation of the heat pump device 100 during the cooling operation is explained next. In the cooling operation, the four-way valve 59 is set in the direction indicated by the broken line. The cooling operation includes not only cooling used for air conditioning but also drawing heat from water to make cold water, performing refrigeration, and the like.

The gas-phase refrigerant (at point 1 in FIG. 24) that has become a refrigerant having a high temperature and a high pressure in the compressor 51 is discharged from the compressor 51 and exchanges heat in the heat exchanger 57, which functions as a condenser and a radiator, to be liquefied (at point 2 in FIG. 24). The liquid-phase refrigerant liquefied in the heat exchanger 57 is decompressed in the expansion mechanism 56 and enters a gas-liquid two-phase state (at point 3 in FIG. 24). The refrigerant that has entered a gas-liquid two-phase state in the expansion mechanism 56 exchanges heat in the internal heat exchanger 55 so as to be cooled and liquefied (at point 4 in FIG. 24). In the internal heat exchanger 55, the refrigerant that has entered a gas-liquid two-phase state in the expansion mechanism 61 in the expansion mechanism 56 exchanges heat with the refrigerant (at point 9 in FIG. 24) that has entered a gas-liquid two-phase state by decompressing the liquid-phase refrigerant liquefied in the internal heat exchanger 55. The liquid-phase refrigerant (at point 4 in FIG. 24) exchanged heat in the internal heat exchanger 55 is divided between the main refrigerant circuit 58 and the injection circuit 62 and flows therein.

The liquid-phase refrigerant flowing in the main refrigerant circuit 58 then exchanges heat with the refrigerant drawn into the compressor 51 through the receiver 54 and is further cooled (at point 5 in FIG. 24). The liquid-phase refrigerant cooled in the receiver 54 is decompressed in the expansion mechanism 53 and enters a gas-liquid two-phase state (at point 6 in FIG. 24). The refrigerant that has entered a gas-liquid two-phase state in the expansion mechanism 53 exchanges heat in the heat exchanger 52, which functions as an evaporator, and is heated (at point 7 in FIG. 24). At this point, because the refrigerant absorbs heat, water circulating in the water circuit 63 is cooled and used for cooling, refrigeration, or the like. Then, the refrigerant heated in the heat exchanger 52 is further heated in the receiver 54 (at point 8 in FIG. 24) and drawn into the compressor 51.

On the other hand, as described above, the refrigerant flowing through the injection circuit 62 is decompressed in the expansion mechanism 61 (at point 9 in FIG. 24) and exchanges heat in the internal heat exchanger 55 (at point 10 in FIG. 24). The refrigerant (injection refrigerant) that has exchanged heat in the internal heat exchanger 55 and is in the gas-liquid two-phase state flows in from the injection pipe of the compressor 51 while remaining in the gas-liquid two-phase state. A compressing operation in the compressor 51 is the same as the compressing operation during the heating operation.

When the injection operation is not performed, as in the heating operation, the aperture of the expansion mechanism 61 is fully closed so that the refrigerant does not flow into the injection pipe of the compressor 51.

In the above explanations, the heat exchanger 52 has been explained as a heat exchanger like a plate type heat exchanger that exchanges heat between the refrigerant and water circulating in the water circuit 63. The heat exchanger 52 is not limited thereto and may be other types of heat exchangers that exchange heat between a refrigerant and air. The water circuit 63 may not be a circuit in which water is circulated, but may be a circuit in which a fluid other than water is circulated.

As described above, the heat pump device 100 can be used for a heat pump device using an inverter compressor in an air conditioner, a heat pump water heater, a refrigerator, a freezing machine, and the like. Accordingly, it is possible to obtain effects of the present embodiment described above in an air conditioner, a heat pump water heater, a refrigerator, a freezing machine using the heat pump device, by applying the motor driving device 30 according to the present embodiment described above to the heat pump device.

Note that, as the switching elements configuring the inverter in the embodiment and the reflux diodes connected to the switching elements in parallel, in general, an Si semiconductor made of silicon (Si) is mainly used. However, a wide bandgap (WBG) semiconductor made of silicon carbide (SiC), gallium nitride (GaN), or diamond can be used.

Switching elements and diode elements formed by such a WBG semiconductor have high voltage resistance and also has high allowable current density. Therefore, it is possible to reduce the switching elements and the diode elements in size. By using the switching elements and the diode elements reduced in size, it is possible to reduce a semiconductor module incorporating these elements in size.

The switching elements and the diode elements made of such a WBG semiconductor also have high heat resistance. Therefore, it is possible to reduce heat radiation fins of a heat sink in size and change a water cooling section to air cooling. Therefore, it is possible to further reduce the semiconductor module in size.

Further, the switching elements and the diode elements made of such a WBG semiconductor have a low power loss. Therefore, the switching elements and the diode elements can be made to have a high efficiency, thereby enabling a semiconductor module to be highly efficient.

Switching at a higher frequency is possible. Thus, it is possible to feed an electric current having a higher frequency to the compressor motor. Therefore, it is possible to reduce an electric current flowing to the inverter through a reduction in a winding current by an increase in the winding impedance of the compressor motor. Therefore, it is possible to obtain the heat pump device having higher efficiency. Further, because it is easy to increase the frequency, there is an advantage in that, for example, it is possible to set the carrier frequency to a frequency equal to or higher than the audible frequency band and it is easy to take measures against noise.

Note that, it is desirable that both of the switching elements and the diode elements are configured by the WBG semiconductor. However, at least one of the elements can be configured by the WBG semiconductor. It is possible to obtain the effects in the embodiment.

Besides the WBG semiconductor, when a MOSFET (Metal-Oxide-Semiconductor Field-Effect Transistor) of a super junction structure known as a high-efficiency switching element is used, it is also possible to obtain the same effects.

The configurations illustrated in the above embodiment are examples of the configuration of the present invention and the configurations can be combined with other publicly known technologies and can be changed, for example, by omitting a part thereof without departing from the scope of the present invention.

The invention claimed is:

1. A motor driving device for driving a motor comprising:
an inverter to convert a direct-current voltage into an alternating-current voltage and apply the alternating-current voltage to the motor, the inverter being used for driving motor; and
a direct-current-voltage detector to detect the direct-current voltage;
a current detector to detect an electric current flowing to the inverter; and
an inverter controller to receive value of the voltage detected by the direct-current voltage detector and a value of the electric current detected by the current detector, and output PWM signals for driving switching elements of the inverter, wherein
a phase difference between a phase of a carrier signal used for generation of the PWM signals and a phase of the alternate-current voltage is set to a value that is not an integer multiple of 60°, and
a frequency of the PWM signal is synchronized with a frequency of the alternating-current voltage, the frequency of the PWM signal being an integer multiple of three times the frequency of the alternating-current voltage.

2. The motor driving device according to claim 1, wherein a shunt resistance is used as the current detector, and the shunt resistance is inserted into a negative-voltage side of the direct-current power supply that is a supply source of direct-current power.

3. The motor driving device according to claim 2, wherein the shunt resistance is arranged between the negative-voltage side of the direct-current power supply and each of the switching elements for at least two phases in lower arms of the inverter.

4. The motor driving device according to claim 3, wherein at least one of the switching elements is made of a wide bandgap semiconductor.

5. A heat pump device having the motor driving device according to claim 3 mounted thereon.

6. A refrigerating and air conditioning device having the motor driving device according to claim 3 mounted thereon.

7. The motor driving device according to claim 2, wherein at least one of the switching elements is made of a wide bandgap semiconductor.

8. A heat pump device having the motor driving device according to claim 2 mounted thereon.

9. A refrigerating and air conditioning device having the motor driving device according to claim 2 mounted thereon.

10. The motor driving device according to claim 1, wherein at least one of the switching elements is made of a wide bandgap semiconductor.

11. A heat pump device having the motor driving device according to claim 10 mounted thereon.

12. A refrigerating and air conditioning device having the motor driving device according to claim 10 mounted thereon.

13. A heat pump device having the motor driving device according to claim 1 mounted thereon.

14. A refrigerating and air conditioning device having the motor driving device according to claim 1 mounted thereon.

* * * * *